Nov. 24, 1942.                G. M. BOUTON ET AL                2,303,194
                                    ALLOY
                             Filed Oct. 4, 1941
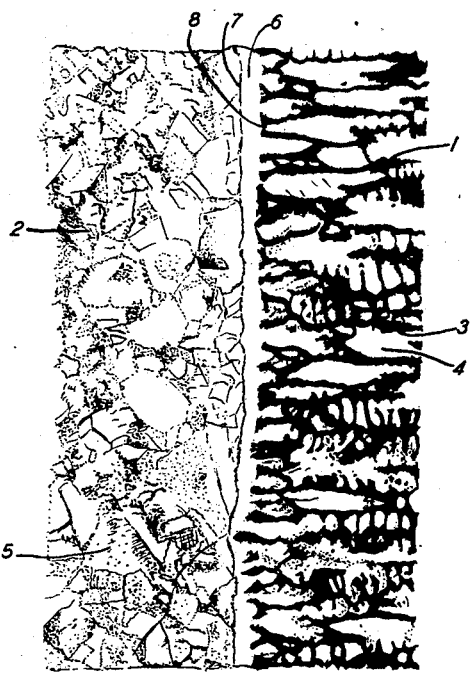
                                            G. M. BOUTON
                              INVENTORS: G. S. PHIPPS
                                            E. E. SCHUMACHER
                                        BY
                                            ATTORNEY Patented Nov. 24, 1942

2,303,194

UNITED STATES PATENT OFFICE 2,303,194

ALLOY

George M. Bouton, Madison, George S. Phipps, Chatham, and Earle E. Schumacher, Maplewood, N. J., assignors to Bell Telephone Laboratories, Incorporated, New York, N. Y., a corporation of New York Application October 4, 1941, Serial No. 413,682

9 Claims. (Cl. 75—166)

This invention relates to lead alloys and more particularly to solder alloys.

While the solder alloys of the present invention may be employed for soldering various kinds of metal, they provide particular advantages in soldering metals which are entirely or predominantly lead. When employed in soldering such metals, the alloys of the present invention adhere tenaciously to the metals being soldered and form joints which are strong and which resist exceptionally well failure due to prolonged static stresses.

It has been found that, surprisingly, soldered joints which have good tensile strengths often fail when subjected to a lower tensile stress which is applied for a long period: i. e., a static stress. Because of their resistance to failure under such conditions, the solder alloys of the present invention are particularly useful in the joining of split sleeves on lead covered cables, such as are employed for telephone or power lines and, for the purposes of illustration, will be discussed in such connection hereinafter.

Whenever lead covered cables or splices thereof are opened for repair or circuit manipulation, the break in the covering of the cable must ultimately be covered and restored to an absolutely water-tight, and if gas is employed in the cable, gas-tight condition. This is usually accomplished by superimposing over the break in the covering of the cable a sleeve and sealing its ends in place, as by a wiping solder or the like. Except in those cases in which the conductors in the cable, and hence the cable as a whole, are severed, this sleeve must be split along its entire length to permit it to be placed around the cable and, when the sleeve is in place, the edges of the split sleeve must be joined together by means of a soldered seam to form an impervious tube.

The durability of these seams heretofore has not been as satisfactory as could be desired. It has been found indeed, that heretofore the occurrence of failures in the seams was greater than in other portions of the cable. When such seam failure occurs, considerable expense and labor are involved in repairing a seam on an aerial cable and usually even greater labor and expense in repairing a seam in an underground cable. Yet such faulty seams must be repaired as soon as possible, for moisture entering a cable through a leaking seam may cause serious damage and interrupt service.

It was found, moreover, that the seams in the sleeves of cables under internal gas pressure tended to fail with even more frequency than those in sleeves of cables not under gas pressure. In gas-filled cables the gas pressure is relatively small, ranging from about 6 to 9 pounds per square inch and would not appear sufficient to cause failure in the seams due to excessive tensile stress. It appeared, however, that the stress in such cables, although low, when sustained over long periods of time had a tendency to cause the ordinary solders, heretofore employed in making such cable sleeve seams, to fail at the interfacial layer between the solder metal and the metal of the sleeve; this even though on tensile strength tests rupturing of the metal of the sleeve rather than the soldered seam indicated that the soldered seam had greater tensile strength than the metal of which the sleeve was made.

It is believed that even in cables which are not gas-filled, sufficient sustained stresses are present to cause the seams soldered with ordinary solders to tend to fail and thus impair the durability of such seams.

The solder alloys of the present invention are specially advantageous for soldering such seams in sleeves on lead covered cables since they largely, if not entirely, overcome such difficulties. The sleeves on such cables, as well as the cable coverings, are predominantly, if not entirely, of lead. The solder alloys of the present invention, when employed in the soldering of such metals provide strong joints which have excellent tensile strengths and which resist to a much greater degree than the best solders heretofore known the effects of sustained, although low, tensile stresses. Cable sleeves having their seams soldered with the alloys of the present invention show very few, if any, seam failures even when such sleeves are employed on gas-filled cables. Through this invention the expense and labor of maintaining cables may readily be reduced and the continuity of operation of such cables increased.

Thus, by employing solder alloys embodying the invention in the soldering of lead or predominantly lead metals, as cable sleeves, it is possible to obtain seams of such strength both in the solder alloy and in the adhesion of solder alloy to the metal being soldered, that the metal being soldered will fail if sufficient tensile stress is applied, or will fail under prolonged relatively low static tensile stress, rather than the solder alloy in the seam or the bond between the solder alloy and the metal being soldered. In any event, failures of seams on lead or substantially lead sleeves of lead covered cables, whether gas-filled or not, are greatly reduced if not practically eliminated by the use of solder alloys embodying the present invention.

The alloys of the present invention contain about 14 to about 22 per cent of cadmium, about 3 to about 10 per cent of tin, about 0.5 to about 3 per cent of antimony, and the balance consisting substantially entirely of lead, although the alloys may also contain small amounts of other ingredients, such as impurities contained in commercial lead, which do not deleteriously affect the characteristics of the alloys of the invention.

A soldering alloy embodying the invention, which is particularly advantageous for soldering seams on lead or predominantly lead sleeves, is one which consists of about 18 per cent of cadmium, 4 per cent of tin, 1.5 per cent of antimony and 76.5 per cent of commercial lead. It melts at approximately 233° centigrade.

Another alloy embodying the invention which may be advantageously employed for this purpose is one consisting of about 18 per cent of cadmium, 4 per cent of tin, 3 per cent of antimony and 75 per cent of lead. Likewise, an alloy consisting of about 18 per cent of cadmium, 10 per cent of tin, 2 per cent of antimony, and 70 per cent of lead also provides advantageous results when so employed.

It is advantageous to employ from 14 to 22 per cent of cadmium since in such event the alloy will contain a large proportion of the eutectic consisting of 18 per cent of cadmium and 82 per cent of lead, which eutectic has the lowest melting point of any lead-cadmium composition. Thus is obtained a comparatively low melting range for a lead-cadmium alloy, which is desirable in a solder alloy.

The presence of from 3 to 10 per cent of tin is desirable since it lowers the melting point of the alloy still further. Less than about 3 per cent of tin, however is unsatisfactory since it does not appreciably lower the melting point; more than about 10 per cent of tin is unsatisfactory since it tends to weaken the bond between the solder alloy and the metal being soldered under sustained stress.

The addition of antimony permits the use of from 3 to 10 per cent of tin without sacrificing good bonding between the solder and the metal being soldered or good resistance to static stress. Amounts of antimony smaller than about .5 per cent are undesirable since they are too small to provide such advantageous effects; amounts of antimony greater than about 3 per cent are undesirable since they cause the alloy to possess a high melting constituent which leads to soldering difficulties and undue segregation.

The alloy indicated above as containing about 18 per cent of cadmium, 4 per cent of tin, 1.5 per cent of antimony and 76.5 per cent of lead, appears to be one of the most advantageous solders of the present invention for soldering lead or predominantly lead metals, such as cable sleeves.

The drawing represents a photomicrograph of a cross section of a junction between a solder alloy of this composition and lead, the alloy being indicated by the reference character 1 and the lead by reference character 2. The irregularly shaped dark spaces 3 on the alloy portion of the drawing represent the lead-cadmium eutectic of the alloy, while the white portions 4 intermingled therewith represent the dendrites of the primary lead in the solder alloy. The crystals 5 indicate the crystalline structure of the pure lead.

From the photomicrograph of the drawing, it is apparent that an interfacial layer 6 exists between the lead being soldered and the soldering alloy. The layer 6, which appears to be characteristic of the junction of lead and the alloy solders of the invention, is a penetration layer between the lead and the lead-cadmium eutectic. It constitutes essentially a solid solution of lead and cadmium. Cadmium diffuses from the lead-cadmium eutectic into the lead. The line on the lead side of the penetration layer, indicated by reference character 7, represents the limit of cadmium diffusion into the lead, while the line on the eutectic side of the layer, indicated by the reference character 8, represents the extent of the solution of the lead by the lead-cadmium eutectic.

It is believed that the excellent tensile strength, particularly under sustained although low stresses, of junctions between solder alloys of the present invention and lead, is related to the fact that such penetration layer is formed. It appears that the extent to which the cadmium diffuses into the lead being soldered to form the interfacial layer 6 exerts a controlling influence on the resistance of the solder joint to sustained stresses such as occur in cable sleeve seams.

The alloys of the present invention may be made according to procedures well-known in the art, so that no discussion of their preparation is necessary.

While the above discussion of the present invention was directed primarily to the soldering of lead or predominantly lead sleeves for lead covered cables, it is apparent that the alloys of the invention may be employed for other purposes.

It is intended that the patent shall cover by suitable expression in the appended claims whatever features of patentable novelty reside in the invention.

What is claimed is:

1. An alloy containing by weight substantially 14 to 22 per cent of cadmium, 0.5 per cent to 3.0 per cent of antimony, 3 per cent to 10 per cent of tin, and a balance consisting substantially entirely of lead.

2. A solder containing by weight substantially 14 to 22 per cent of cadmium, 3 to 10 per cent of tin, 0.5 to 3.0 per cent of antimony and a balance consisting substantially entirely of lead.

3. An alloy containing by weight approximately 18 per cent of cadmium, 4 per cent of tin, 1.5 per cent of antimony and 76.5 per cent of lead.

4. A solder consisting by weight of about 18 per cent of cadmium, 4 per cent of tin, 1.5 per cent of antimony and 76.5 per cent of lead.

5. An alloy containing by weight approximately 18 per cent of cadmium, 4 per cent of tin, 3 per cent of antimony and 75 per cent of lead.

6. An alloy containing by weight approximately 18 per cent of cadmium, 10 per cent of tin, 2 per cent of antimony and 70 per cent of lead.

7. A soldered joint in which the solder contains by weight substantially 14 to 22 per cent of cadmium, 0.5 per cent to 3.0 per cent of antimony, 3 per cent to 10 per cent of tin, and a balance consisting substantially entirely of lead.

8. A solder consisting by weight of about 18 per cent of cadmium, 4 per cent of tin, 3 per cent of antimony and 75 per cent of lead.

9. A solder consisting by weight of about 18 per cent of cadmium, 10 per cent of tin, 2 per cent of antimony and 70 per cent of lead.

GEORGE M. BOUTON.
GEORGE S. PHIPPS.
EARLE E. SCHUMACHER.